(12) United States Patent
Witlicki

(10) Patent No.: US 8,747,054 B2
(45) Date of Patent: Jun. 10, 2014

(54) BEARING SYSTEM FOR GAS TURBINE ENGINE

(75) Inventor: Russell B. Witlicki, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 575 days.

(21) Appl. No.: 13/012,008

(22) Filed: Jan. 24, 2011

(65) Prior Publication Data

US 2012/0189429 A1 Jul. 26, 2012

(51) Int. Cl.
*F01D 25/16* (2006.01)

(52) U.S. Cl.
USPC .......................................................... 415/119

(58) Field of Classification Search
USPC .............. 415/113, 174.2, 229, 104, 107, 110, 415/111, 132, 14, 170.1, 174.4, 174.5, 177, 415/230, 231; 416/1; 384/99, 490
See application file for complete search history.

(56) References Cited

U.S. PATENT DOCUMENTS

| | | |
|---|---|---|
| 4,214,796 A | 7/1980 | Monzel et al. |
| 4,429,923 A | 2/1984 | White et al. |
| 4,453,783 A | 6/1984 | Davis et al. |
| 4,460,283 A | 7/1984 | Yoshioka et al. |
| 4,527,910 A | 7/1985 | Fleming |
| 4,527,912 A | 7/1985 | Klusman |
| 4,687,346 A | 8/1987 | Suciu |
| 4,793,722 A | 12/1988 | Jensen |
| 5,080,499 A | 1/1992 | Klusman et al. |
| 5,088,840 A | 2/1992 | Radtke |
| 5,188,375 A | 2/1993 | Pope et al. |
| 5,344,239 A * | 9/1994 | Stallone et al. ................. 384/99 |
| 5,421,655 A | 6/1995 | Ide et al. |
| 5,531,522 A | 7/1996 | Ide et al. |
| 5,603,574 A | 2/1997 | Ide et al. |
| 6,135,639 A | 10/2000 | Dede |
| 6,413,046 B1 * | 7/2002 | Penn et al. ........................ 416/1 |
| 6,439,772 B1 * | 8/2002 | Ommundson et al. .......... 384/99 |
| 6,443,698 B1 | 9/2002 | Corattiyil et al. |
| 6,540,483 B2 | 4/2003 | Allmon et al. |
| 6,682,219 B2 | 1/2004 | Alam et al. |
| 6,910,863 B2 | 6/2005 | Scardicchio et al. |
| 7,066,651 B2 | 6/2006 | Nicholas et al. |
| 7,109,619 B2 | 9/2006 | Brunken, Jr. |
| 7,111,823 B2 | 9/2006 | Hansen |
| 7,334,982 B2 | 2/2008 | Singh et al. |
| 7,384,199 B2 | 6/2008 | Allmon et al. |
| 7,524,112 B2 | 4/2009 | Gerez et al. |
| 7,574,854 B2 | 8/2009 | Moniz |
| 7,704,029 B2 | 4/2010 | Blais et al. |
| 7,731,426 B2 | 6/2010 | Meacham et al. |
| 2002/0067870 A1 | 6/2002 | Ommundson et al. |
| 2009/0148274 A1* | 6/2009 | Kostka et al. ............. 415/170.1 |
| 2009/0285674 A1* | 11/2009 | Mollmann et al. ......... 415/170.1 |

* cited by examiner

*Primary Examiner* — Nathaniel Wiehe
*Assistant Examiner* — Eldon Brockman
(74) *Attorney, Agent, or Firm* — Carlson, Gaskey & Olds, P.C.

(57) ABSTRACT

A bearing system for a gas turbine engine includes a spring defined about an axis of rotation. The spring has a multiple of beams which extend between a flange structure and an attachment structure. A damper defined about the axis of rotation and mounted to the spring to at least partially axially overlap the multiple of beams.

16 Claims, 5 Drawing Sheets

BEARING SYSTEM FOR GAS TURBINE ENGINE

BACKGROUND

The present disclosure relates to a gas turbine engine, and in particular, to a sprung and damped bearing system for a gas turbine engine rotor assembly.

Gas turbine engines typically include one or more rotor shafts that transfer power and rotary motion from a turbine section to a compressor and fan section. Each rotor shaft is supported with a plurality of bearing systems.

Rotor dynamics require some bearing systems to be sprung and damped. The spring is typically a series of beams arranged in a cage-like structure to provide particular rotor dynamic stiffness requirements. The damper minimizes the transfer of vibrational forces from the bearing assembly into static structure. Clearance requirements, geometric tolerances and thermal growth considerations define a bearing compartment axial length which, in a turbine section, typically affects a turbine disk bore dimension and the weight thereof.

SUMMARY

A bearing system for a gas turbine engine according to an exemplary aspect of the present disclosure includes a spring defined about an axis of rotation. The spring has a multiple of beams which extend between a flange structure and an attachment structure. A damper defined about the axis of rotation and mounted to the spring to at least partially axially overlap the multiple of beams.

A gas turbine engine according to an exemplary aspect of the present disclosure includes a spring defined about an axis of rotation. The spring has a multiple of beams which extend between an attachment structure and a flange structure with a centering spring that extends radially inward from the attachment structure. The flange structure mounts the spring to static structure. A damper is defined about the axis of rotation and is mounted to the spring to at least partially axially overlap the multiple of beams. A bearing is mounted to the centering spring to rotationally support a rotor shaft.

A method for assembling a rotor within a static structure of a gas turbine engine according to an exemplary aspect of the present disclosure includes mounting a damper to a spring defined about an axis of rotation, the spring having a multiple of beams which extend between an attachment structure and a flange structure, the damper at least partially axially overlapping the multiple of beams. Mounting the flange and the damper to a static structure and rotationally supporting a rotor shaft about the axis of rotation within a bearing supported by the spring.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
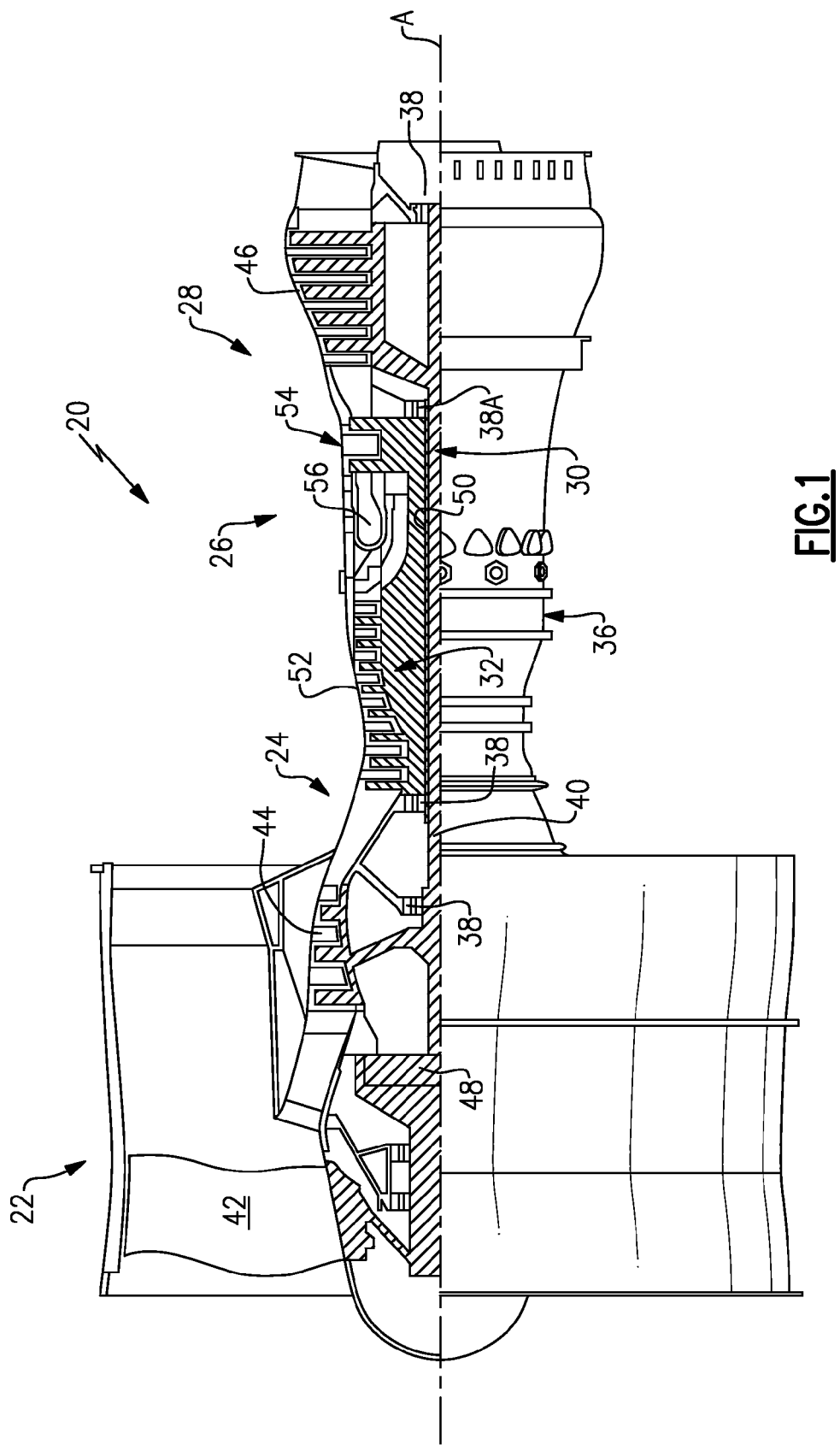
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and high speed spool 32 mounted for rotation about an engine central longitudinal axis A relative to an engine static structure 36 via several bearing systems 38. The low speed spool 30 generally includes an inner shaft 40 that interconnects a fan 42, a low pressure compressor 44 and a low pressure turbine 46. The inner shaft 40 may drive the fan 42 either directly or through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel in the combustor 56, then expanded over the high pressure turbine 54 and low pressure turbine 46. The turbines 54, 46 rotationally drive the respective low speed spool 30 and high speed spool 32 in response to the expansion.

The main engine shafts 40, 50 are supported at a plurality of points by the bearing system 38 within the static structure 36. In one non-limiting embodiment, bearing system 38 is referred to as number four bearing system 38A located within the turbine section 28.

Figure 2:
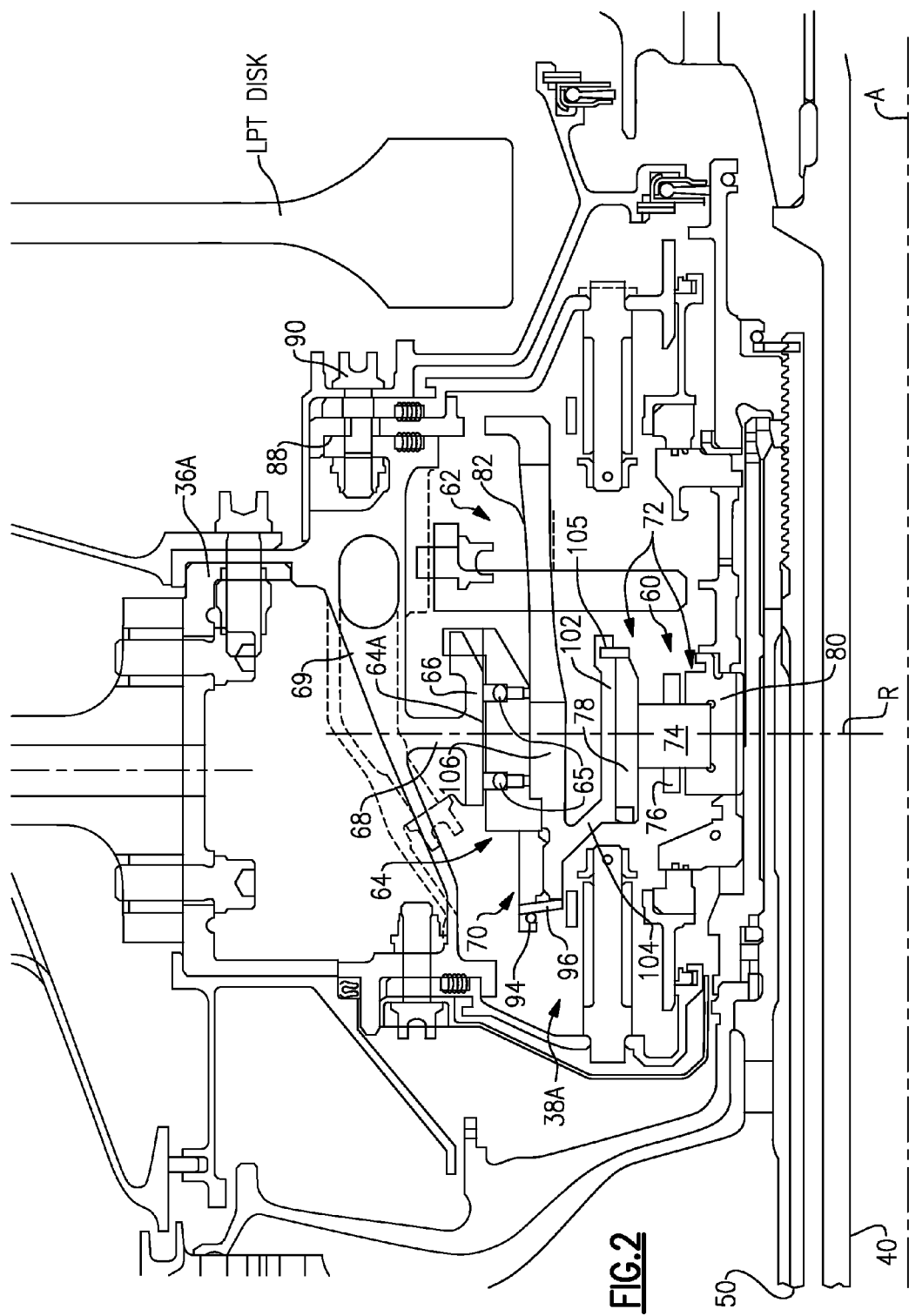
FIG. 2 is an enlarged sectional view of a section of the gas turbine engine which illustrates a bearing system.

With reference to FIG. 2, the bearing system 38A generally includes a bearing 60, a spring 62, and a damper ring 64. The bearing system 38A is supported by a static structure which includes a bearing support static structure 69 and a mid-turbine frame static structure 36A. In one disclosed non-limiting embodiment, the bearing support static structure 69 includes a static cylindrical beam 66 supported upon a static radial web 68. It should be understood that the bearing support static structure 69 may be of various configurations. The static cylindrical beam 66 abuts the damper ring 64 which is retained to the spring 62 in a nested arrangement by a fastener assembly 70. The spring 62 is mounted to the bearing support static structure 69, which is mounted to the mid-turbine frame 36A to support the bearing 60 and, in turn, the outer shaft 50 to absorb rotor motion associated with non-synchronous vibration through an axially compact assembly.

The bearing 60 generally includes a paired race 72, a plurality of rolling elements 74, and a cage 76. The paired race 72 includes an outer race 78 and an inner race 80 radially inward from the outer race 78. Each rolling element 74 is located in rolling contact between inner race 80 and outer race 78 and spaced circumferentially by the cage 76.

Figure 3:
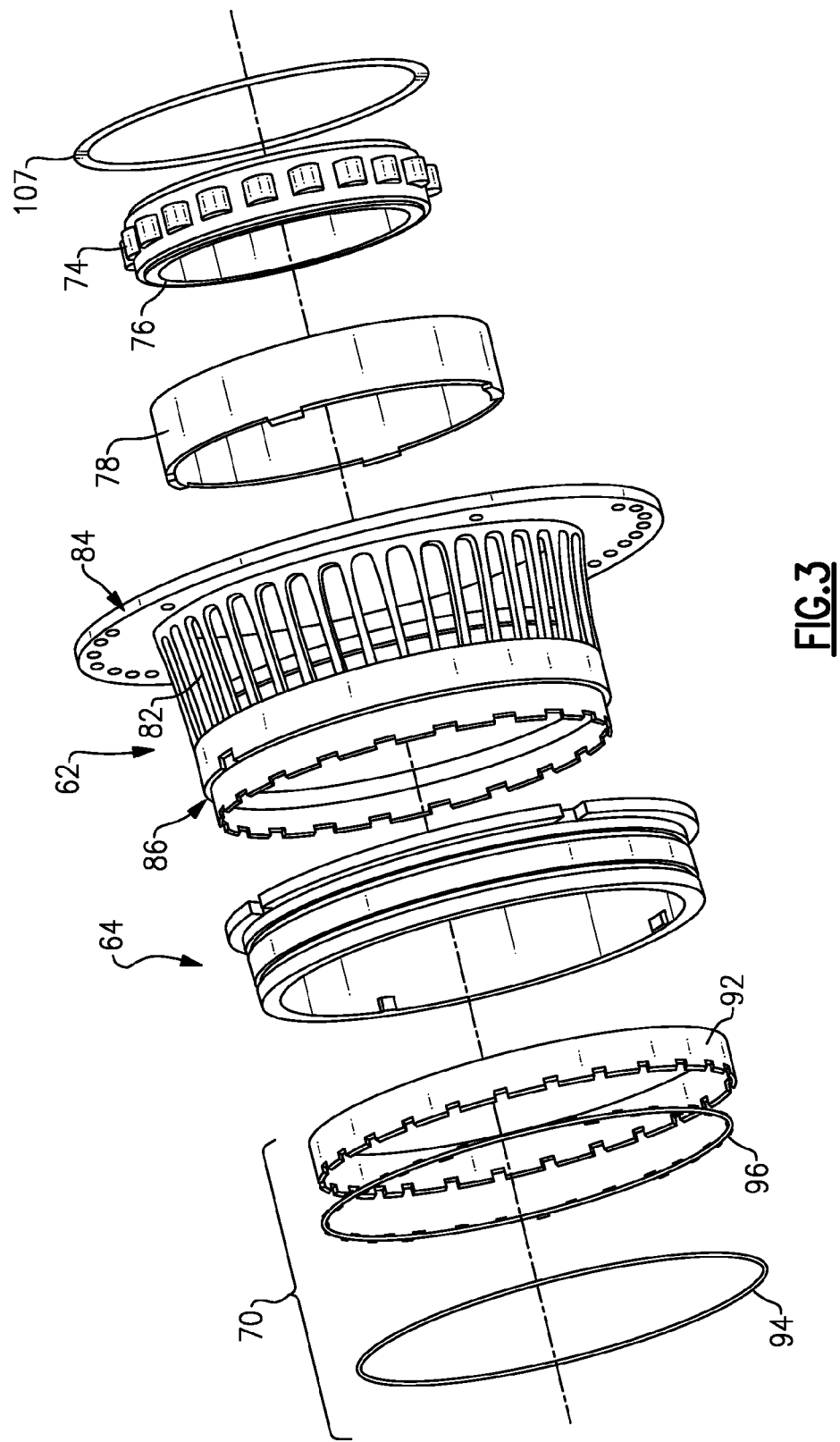
FIG. 3 is an exploded view of the bearing system.
Figure 4:
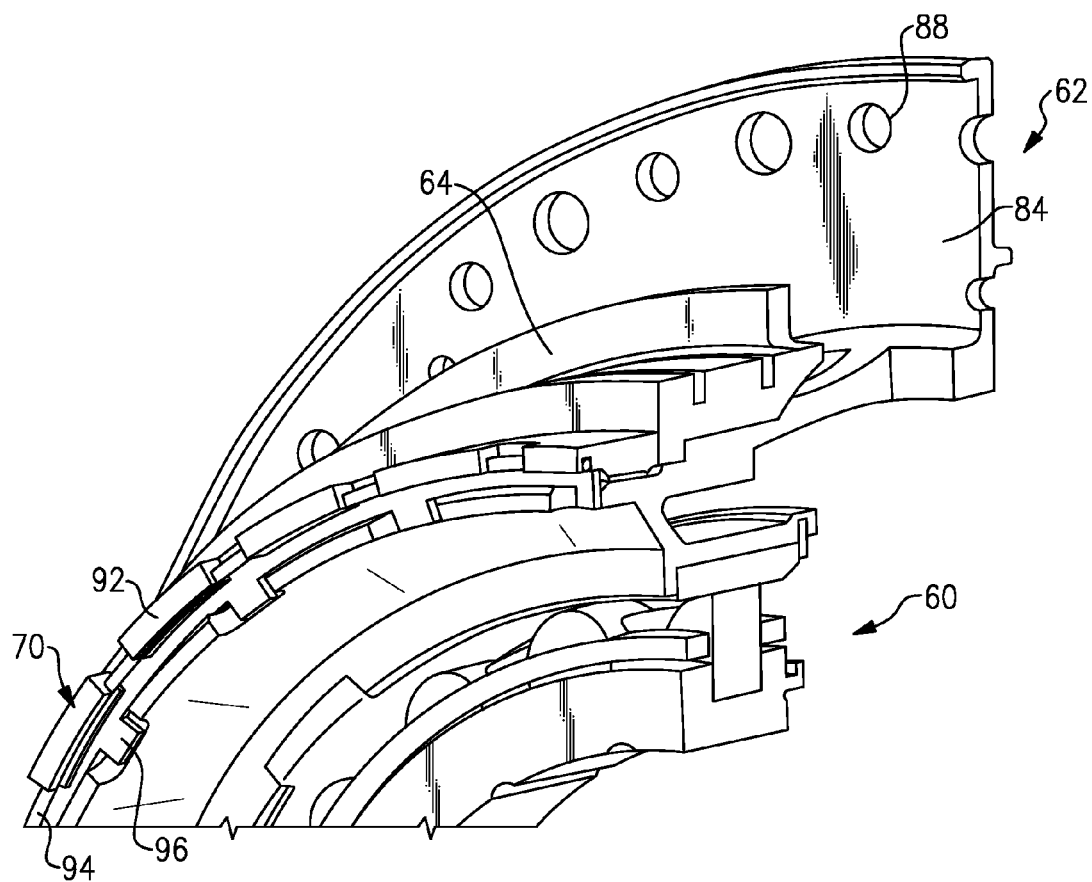
FIG. 4 is an enlarged sectional view of the bearing system.

The spring 62 is a generally cylindrical fully machined cage-like structural component with a multiple of beams 82 which extend between a flange structure 84 and an attachment structure 86 (FIG. 3). In one embodiment, the beams 82 are double-tapered beams arrayed circumferentially to control a radial spring rate that may be selected based on a plurality of considerations including, but not limited to, bearing loading, bearing life, rotor dynamics, and rotor deflection considerations. The flange structure 84 defines a radial flange with a multiple of apertures 88 which receive a fastener 90 to mount the spring 62 to the static bearing support structure 69. The attachment structure 86 is configured to receive the fastener assembly 70 which may include a spanner nut 92, a retainer ring 94 and a anti-rotation washer 96 (FIG. 4). It should be understood that other fastener arrangements such as bolting, welding, etc., may alternatively or additionally be utilized.

Figure 5:
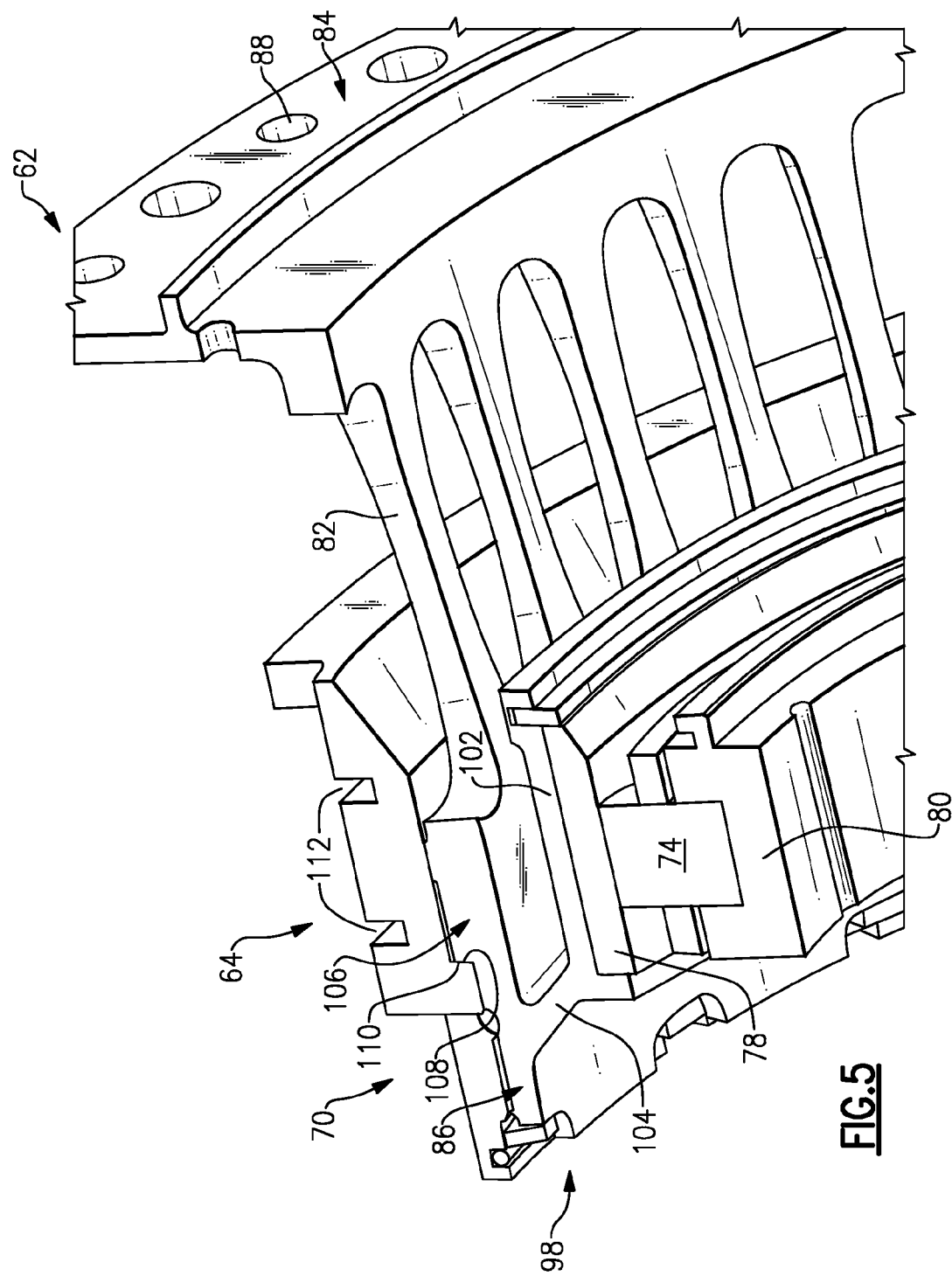
FIG. 5 is an enlarged sectional view of the bearing system.

With reference to FIG. 5, a bearing centering spring 98 extends radially inward from the attachment structure 86 opposite a damper interface 106. The bearing centering spring 98 includes a cylindrical beam 102 supported upon a radial web 104 such that the rolling element 74 is radially aligned with the radial web 68 along axis R. The cylindrical beam 102 may further include an engagement feature 105 to engage the retaining ring 107 to retain the outer race 78 such that the bearing 60 is radially displaced from and axially overlapped with the beams 82.

A damper interface 106 is located radially outward from the attachment structure 86 opposite the bearing centering spring 98. The damper interface 106 includes a stop feature 108 which receives a radially inwardly extending step 110 of the damper ring 64 such that the damper ring 64 may be axially locked onto the spring 62 by the fastener assembly 70.

Damper ring 64 provides a distribution flow path for oil to enter an annulus 64A formed between damper ring 64 and the cylindrical beam 66. The oil is delivered to the annulus 64A via a vertical passage (not shown) in web 68. The damper grooves 112 in the damper ring 64, contain sealing rings 65 such that the oil is contained in the annulus 64A formed between the sealing rings 65, the inner diameter of static cylindrical beam 66, and the outer diameter of damper ring 64 such that the oil functions as a fluid damper.

The damper grooves 112 axially overlap at least a portion of the beams 82 to provide an axially compact nested configuration. That is, the bearing system 38A configuration separates the machined spring 62 and damper ring 64 into two separate pieces of hardware that are nested together to provide an axially compact assembly. The distance between the sealing rings 65 is of a significant axial distance as the nested configuration of the damper grooves 112 at least partially overlap the beams 82 to define a relatively large annulus 64A that can contain more oil and have a greater damping effect.

The axial compact assembly facilitates an axially short bearing compartment, which in turn allows the first LPT disk bore (FIG. 2) to be radially smaller. The radially smaller LPT disk bore—which extends closer to axis A—results in a significantly lighter weight spool for an overall engine weight savings. The separate components also facilitate a relatively less complicated manufacture process and allows for more design flexibility through the nested overlap and separate machineability.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A bearing system for a gas turbine engine comprising:
a spring defined about an axis of rotation, said spring having a multiple of beams which extend between a flange structure and an attachment structure, and a centering spring that includes a radial web extending, relative to said axis, along a slanted midline radially inwardly from said attachment structure to a cylindrical beam; and
a damper defined about said axis of rotation, said damper mounted to said attachment structure to at least partially axially overlap said multiple of beams.

2. The bearing system as recited in claim 1, wherein said damper is mounted to an outer diameter of said spring.

3. The bearing system as recited in claim 2, wherein said damper is mounted to a damper interface adjacent to said attachment structure.

4. The bearing system as recited in claim 1, further comprising a fastener assembly mountable to said attachment structure to axially retain said damper to said spring.

5. The bearing system as recited in claim 1, further comprising a bearing race mounted in said cylindrical beam.

6. The bearing system as recited in claim 5, wherein said bearing race is retained in said cylindrical beam by a retainer ring.

7. The bearing system as recited in claim 6, wherein said cylindrical beam includes an engagement feature engaged with said retainer ring and retaining said bearing race in said cylindrical beam.

8. The bearing system as recited in claim 5, wherein said bearing race abuts a step in the cylindrical beam.

9. The bearing system as recited in claim 5, wherein said damper includes first and second spaced-apart grooves that open radially outwardly, and first and second sealing rings in, respectively, said first and second spaced-apart grooves.

10. The bearing system as recited in claim 9, further comprising an outer static cylindrical beam radially outwards of said damper, said outer static cylindrical beam and said damper defining there between an annulus extending axially between said first and second grooves, said annulus configured to contain oil as a fluid damper.

11. A gas turbine engine comprising:
a static structure;
a rotor shaft defined about an axis of rotation;
a spring defined about said axis of rotation, said spring having a multiple of beams which extend between an attachment structure and a flange structure which is mounted to said static structure, a centering spring that includes a radial web extending, relative to said axis, along a slanted midline radially inwardly from said attachment structure to a cylindrical beam;
a damper defined about said axis of rotation, said damper mounted to said attachment structure to at least partially axially overlap said multiple of beams; and a bearing mounted to said cylindrical beam and said rotor shaft to rotationally support said rotor shaft.

12. The gas turbine engine as recited in claim 11, further comprising a fastener assembly mounted to said attachment structure to axially retain said damper to said spring.

13. The gas turbine engine as recited in claim 11, wherein a bearing element of said bearing is axially aligned with said damper.

14. The gas turbine engine as recited in claim 11, wherein said static structure is a static bearing support and a mid-turbine frame static structure.

15. A method for assembling a rotor within static structure of a gas turbine engine comprising:
- mounting a damper to a spring defined about an axis of rotation, the spring having a multiple of beams which extend between an attachment structure and a flange structure, and a centering spring that includes a radial web extending, relative to said axis, along a slanted midline radially inwardly from said attachment structure to a cylindrical beam, the damper at least partially axially overlapping the multiple of beams;
- mounting the flange to a static structure;
- mounting the damper to the attachment structure; and
- rotationally supporting a rotor shaft about the axis of rotation within a bearing supported by the spring.

16. The method as recited in claim 15, further comprising:
- axially retaining the damper to the spring with a fastener assembly.

* * * * *